United States Patent [19]

Melzer

[11] 4,291,941
[45] Sep. 29, 1981

[54] OPTICAL FIBER CONNECTOR

[75] Inventor: Erich G. Melzer, Redlands, Calif.

[73] Assignee: The Deutsch Company Electronic Components Division, Los Angeles, Calif.

[21] Appl. No.: 118,468

[22] Filed: Feb. 4, 1980

[51] Int. Cl.³ .................................. G02B 7/26
[52] U.S. Cl. ................................ 350/96.18; 29/280; 350/96.21
[58] Field of Search ............ 350/96.18, 96.21; 29/271, 272, 278, 280

[56] References Cited

U.S. PATENT DOCUMENTS

| | | | |
|---|---|---|---|
| 3,151,330 | 10/1964 | Scuccimarri | 29/278 UX |
| 3,349,652 | 10/1967 | Cromwell | 29/271 UX |
| 3,685,126 | 8/1972 | Kane | 29/271 X |
| 4,060,309 | 11/1977 | Le Noane et al. | 350/96.21 X |
| 4,119,362 | 10/1978 | Holzman | 350/96.18 |
| 4,136,431 | 1/1979 | Tucker | 29/280 X |
| 4,158,476 | 6/1979 | McCartney | 350/96.21 |
| 4,186,998 | 2/1980 | Holzman | 350/96.21 |
| 4,190,316 | 2/1980 | Malsby et al. | 350/96.18 |
| 4,211,469 | 7/1980 | Holzman | 350/96.18 |

FOREIGN PATENT DOCUMENTS 2743562  4/1978  Fed. Rep. of Germany ... 350/96.21

Primary Examiner—John D. Lee
Attorney, Agent, or Firm—Gausewitz, Carr, Rothenberg & Edwards

[57] ABSTRACT

This invention provides an optical fiber connector that includes a tubular receptacle with a lens at its central portion and fiber termination units extending into its opposite ends. Each of the fiber termination units includes two elements, one telescopingly received in the other and resiliently biased toward the lens. A nut engages either end of the receptacle and the outer element of the fiber termination unit, biasing the latter element against a positive stop which limits its axial travel toward the lens. A single seal at each nut engages the receptacle and the fiber termination unit to preclude entry of foreign matter. The fibers are gripped by resilient members compressed around the fibers by crimped portions of the fiber holding units. An elongated tool, with spaced shoulders, positions the lens and its retention springs at the center of the receptacle.

14 Claims, 9 Drawing Figures

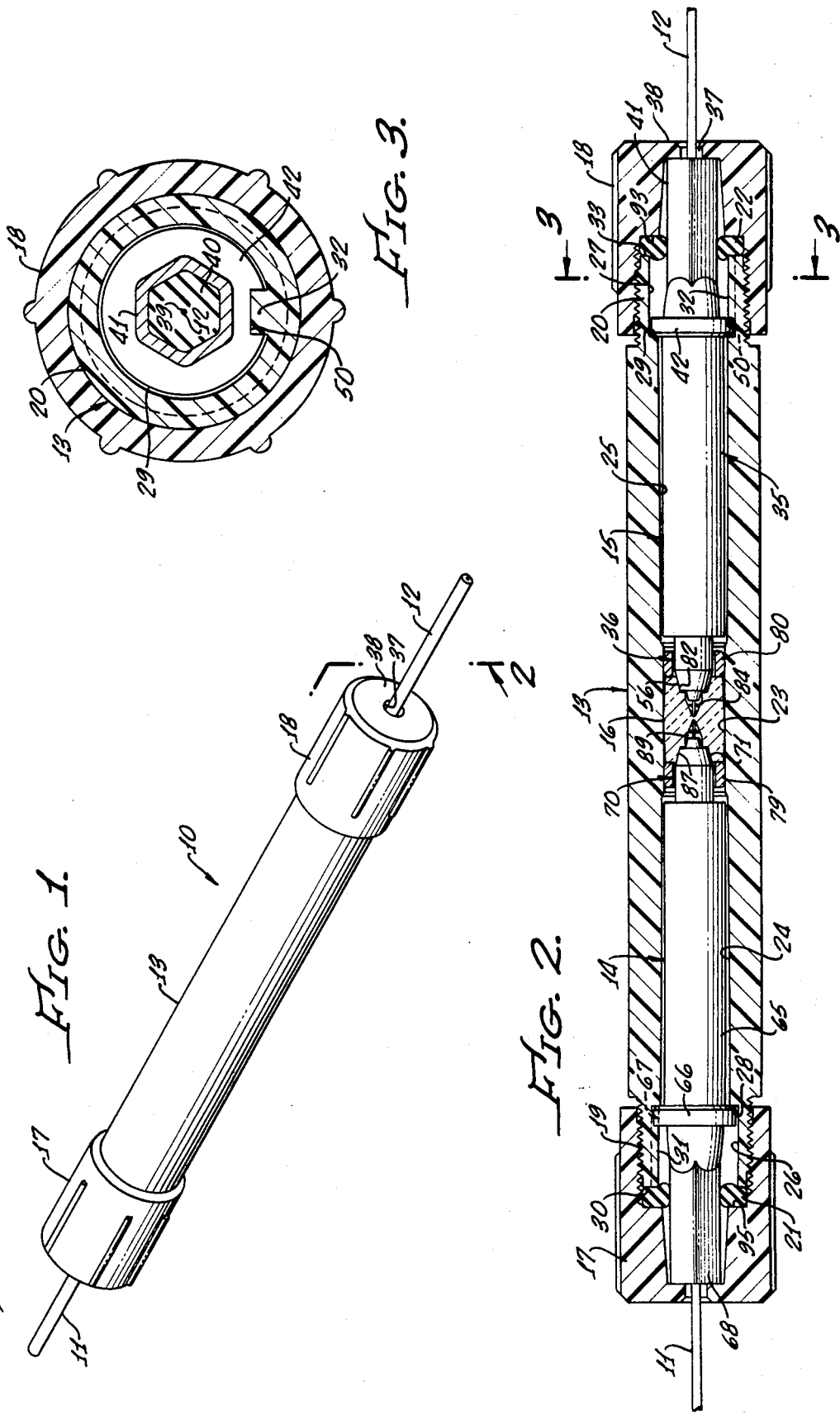

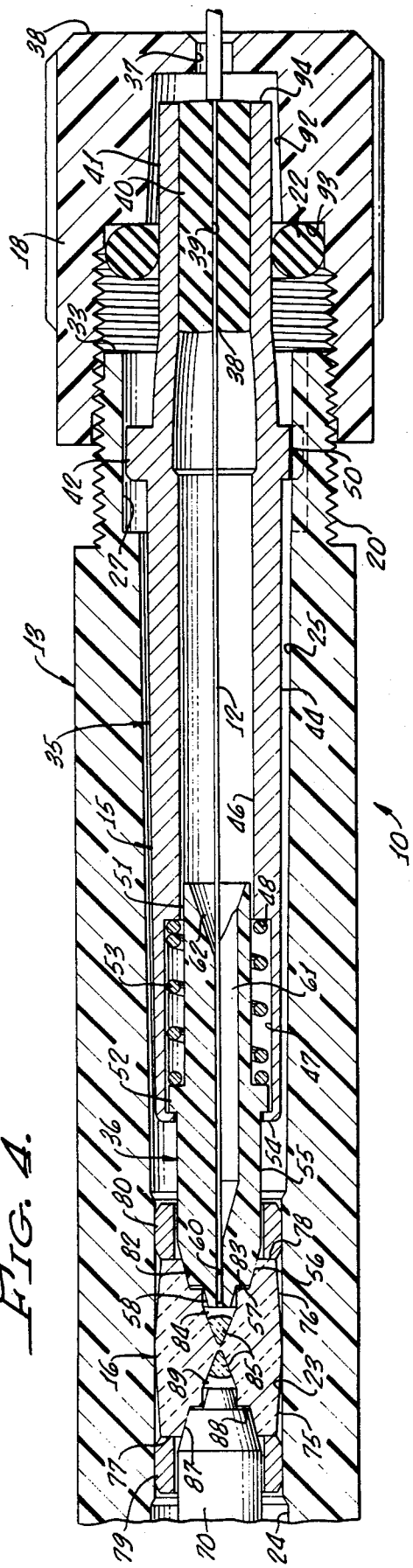
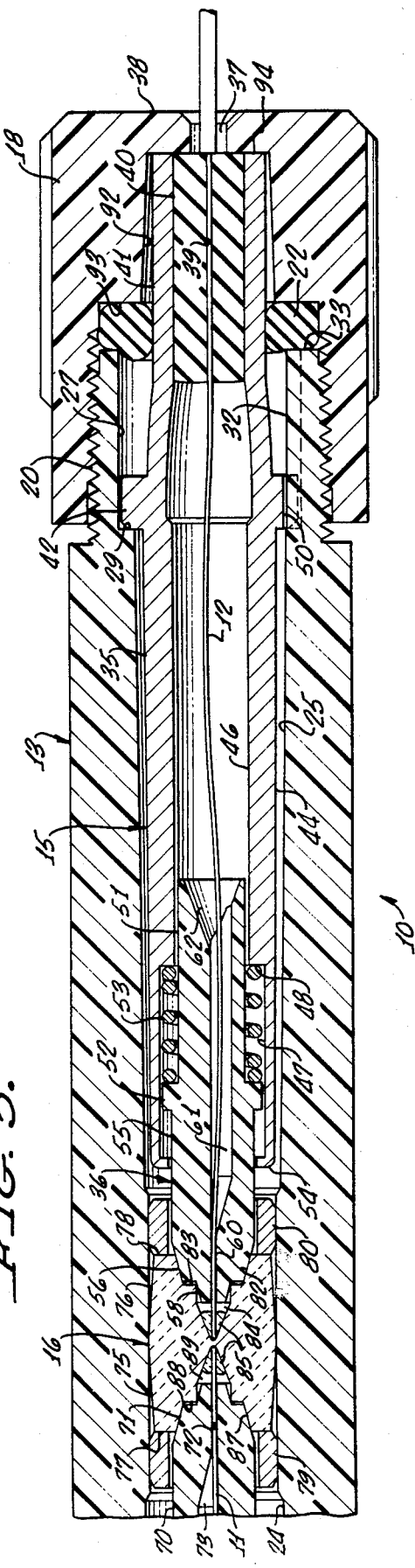

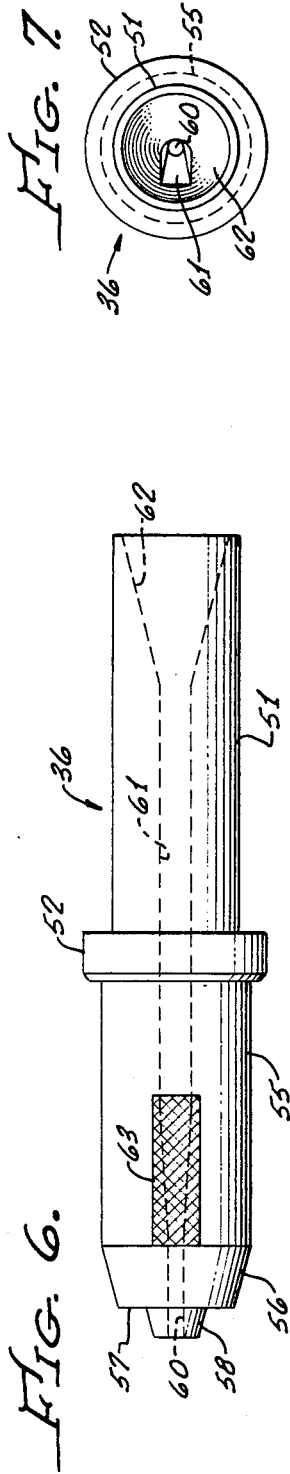
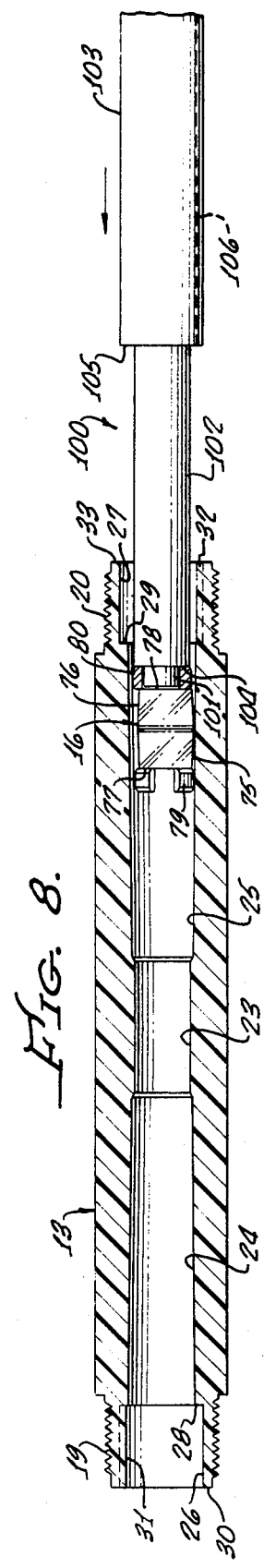
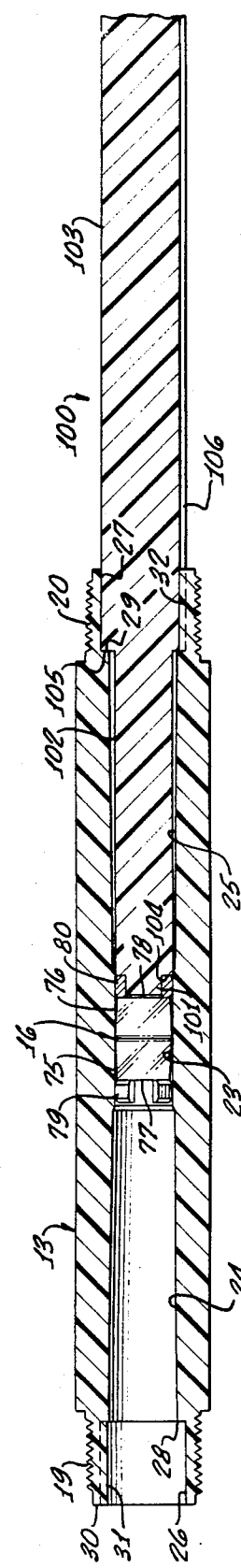

OPTICAL FIBER CONNECTOR

BACKGROUND OF THE INVENTION

1. Field of the Invention

This invention relates to a connector for optical fibers.

2. Description of Prior Art

An optical fiber connector that will effectively couple optical fibers for efficient transmission of light between them is disclosed in patent application Ser. No. 874,558, filed Feb. 2, 1978, by Malsby et al, for Connector for Optical Fibers, now U.S. Pat. No. 4,190,316. However, this connector is bulkier than is desirable for some uses and is relatively complex with a multiplicity of parts. It requires two seals at either end of the connector, raising the possibility of entry of foreign material into the connector at each of these locations.

SUMMARY OF THE INVENTION

The connector of this invention is an improvement on the aforementioned optical connector, providing a device which is of simplified design, small in volume, light in weight, and economically manufactured. Nevertheless, it accurately positions the optical fibers for efficient transmission of light from one to the other. A minimum number of components are easily assembled in producing the connector. Mating and unmating the connector are simple operations. Only a single seal is required at either end of the connector to minimize the possibility of the entrance of foreign matter. The various components of the connector are entirely received within the receptacle assembly, protecting them from damage and enhancing the appearance of the connector.

The connector of this invention includes an elongated tubular receptacle at the central portion of which is a lens held in position by two springs which frictionally engage the interior surface of the receptacle. A fiber termination assembly extends into either end of the receptacle with the ends being closed out by nuts which engage the periphery of the receptacle ends. These nuts bias the outer elements of the fiber termination assemblies forwardly, holding them against abutments in the receptacle so that they are positioned axially at exact locations within the receptacle. Each of the outer elements resiliently biases an inner element forwardly to engage a tapered aligning surface of the lens, and also forces the fiber end into a cavity in the lens where it engages a tapered surface. The accurate axial positioning of the outer element of the fiber holding unit assures that exactly the right force is exerted at each of the tapered aligning surfaces. The fibers are held by a simple arrangement in which they are inserted through resilient members and the end parts of the outer elements of the fiber termination assemblies are crimped inwardly. This compresses the resilient members so that they frictionally grip the fibers without causing damage to them. This contrasts with the multiplicity of parts in the fiber clamping arrangement in the prior art referred to above.

BRIEF DESCRIPTION OF THE DRAWINGS

FIG. 1 is a perspective view of the optical fiber connector of this invention;

FIG. 2 is an enlarged longitudinal sectional view, taken along line 2—2 of FIG. 1;

FIG. 3 is a further enlarged transverse sectional view, taken along line 3—3 of FIG. 2;

FIG. 4 is an enlarged fragmentary, longitudinal sectional view of the components of the connector as the mating of the connector is commenced but prior to completion of this operation;

FIG. 5 is a view similar to FIG. 4 with the mating of the connector complete;

FIG. 6 is a plan view of one of the forward retention sleeves;

FIG. 7 is an end elevational view of the forward retention sleeve of FIG. 6;

FIG. 8 is a sectional view of the receptacle and the tool used for inserting the lens into the receptacle at the beginning of the step of inserting the lens; and FIG. 9 is a view similar to FIG. 8 at the completion of the insertion of the lens.

DETAILED DESCRIPTION OF THE EMBODIMENT

The connector 10 of this invention serves to couple single optical fibers 11 and 12 so that light can be transmitted from one to the other. The connector includes a tubular receptacle 13 within which are two termination assemblies 14 and 15 that receive the optical fibers 11 and 12, respectively. The fibers extend to a lens 16 at the center of the receptacle, which is a transparent member of predetermined index of refraction that refracts the light and transmits it from one fiber to the other. At the opposite ends of the receptacle 13 are clamping nuts 17 and 18 which hold the two termination assemblies 14 and 15 within the receptacle. The opposite end portions 19 and 20 of the receptacle 13 are of reduced interior diameter and threaded on the outside to mate with the threads of the two nuts 17 and 18. As a result, the termination assemblies 14 and 15, and the lens 16 are entirely received within the receptacle 13 and the two clamping nuts 17 and 18. Elastomeric O-rings 21 and 22 inside the nuts 17 and 18 seal the mated connector at the only locations where foreign matter otherwise could enter.

The interior of the receptacle 13 includes a central portion 23 of relatively small diameter, on either side of which are longer portions 24 and 25 that are only slightly larger. The latter portions flare at a very shallow angle to their outer ends. At the end portions 19 and 20, the diameters of the relatively short interior surfaces 26 and 27, respectively, are relatively large. This results in a radial shoulder 28 interconnecting the surfaces 24 and 26 at one end, and a similar radial shoulder 29 between the surfaces 25 and 27 at the opposite end of the receptacle 13. Extending axially from the shoulder 29 to the left-hand radial end surface 30 of the receptacle, as illustrated, is a key 31 which projects inwardly of the surface 26. A similar key 32 projects from the surface 27 at the right-hand end of the receptacle 13 and extends axially from the shoulder 29 to the outer end surface 33 of the receptacle. The key 32 is diametrically opposite from the key 31.

The termination assembly 15, which is shown in enlarged detail in FIGS. 4 and 5, includes a rearward sleeve 35 and a shorter forward sleeve 36, which telescopes into the forward end of the sleeve 35. The optical fiber 12 extends into the connector 10 through an opening 37 in the radial outer end wall 38 of the nut 18, and into the rearward sleeve 35 through an axial opening 39 in a resilient rubber insert 40 received in the rearward end portion 41 of the rearward sleeve. The rearward end portion 41 originally is cylindrical, but is crimped inwardly to a hexagonal shape so as to radially compress the insert 40. This, in turn, causes the insert 40 to be squeezed against the fiber 12 at the opening 39, thereby frictionally retaining the fiber 12 and preventing axial movement. This also forms a seal around the fiber at the opening 39.

Forwardly of the rearward end portion 41, the sleeve 35 includes an exterior annular radial flange 42. The remaining portion 44 of the sleeve 35, from the flange 42 to the forward end, has a cylindrical outside surface of constant diameter. There is a clearance between this part of the sleeve 35 and the interior wall 25 of the receptacle, which receives it.

Interiorly, the bore 46 extends from the vicinity of the flange 42 to a counterbore 47 at the forward end of the rearward sleeve 35. A radial shoulder 48 conects the counterbore 47 to the bore 46.

The rearward sleeve 35 is aligned rotationally by a keyway 50 in the flange 42 that receives the key 32 of the receptacle.

The rearward end portion 51 of the sleeve 36 is of relatively small outside diameter, terminating at a radial flange 52 at the midportion of the sleeve. A compression spring 53 in the counterbore 47 bears against the flange 52 and the shoulder 48 of the sleeve 35. This resiliently biases the forward sleeve 36 forwardly relative to the sleeve 35. An inwardly directed flange 54 at the forward end of the rearward sleeve 35 is engageable by the flange 52 of the sleeve 36 to limit forward travel and prevent the sleeve 36 from escaping when the connector is unmated.

Forwardly of the flange 54 the sleeve 36 has a cylindrical outer surface 55, which extends beyond the rearward sleeve 35 to a frustoconical surface 56 that tapers inwardly at a shallow angle. In the example shown, the included angle of the frustoconical surface 56 is 30°. The surface 56 terminates at a radial end wall 57 at the central portion of which is a short frustoconical section 58.

Interiorly, the forward sleeve 36 includes a cylindrical opening 60 at its forward end, which communicates with a radial slot 61 that extends axially the major portion of the length of the sleeve 36. The slot 61 extends radially in only one direction from the axis of the sleeve 36. At its rearward end, there is an outwardly flared frustoconical end 62 to the opening through the sleeve which facilitates guiding the fiber 12 into this opening.

Exteriorly, there is a stripe 63 on the surface 55 radially aligned with the slot 61. The forward sleeve 36 is positioned rotationally such that the stripe 63, and hence the slot 61, are aligned with the keyway 50 of the rearward sleeve 35. The friction between the spring 53 and the sleeve 36 maintains the sleeve 36 in its rotational position.

The termination assembly 14 is identical to the termination assembly 15. Hence, it includes a rearward sleeve 65 having an exterior flange 66 within which is a keyway 67 that receives the key 31 of the receptacle 13. The optical fiber 11 is gripped at the crimped rearward end 68 of the rearward sleeve 65.

The forward sleeve 70 of the assembly 14 is spring biased forwardly and at its forward end includes a frustoconical exterior surface 71 corresponding to the surface 56 of the sleeve 36. Interiorly there is a cylindrical axial opening 72 communicating with a slot 73 that extends radially out in one direction from the axis. The slot 73, through an exterior indicating stripe, is positioned in alignment with the keyway 67 in the outer sleeve 65. As a result, the slot 73 is diametrically opposite from the slot 61.

The lens 16, at the center of the connector, has an outer surface which tapers toward the opposite ends of the receptacle. This includes frustoconical surface 75 which tapers at a shallow angle toward the end 30, and a frustoconical surface 76 that similarly tapers toward the end 33. At the juncture of these two surfaces, which is at the axial center of the lens, the outside diameter of the lens approximates that of the central inner wall 23 of the receptacle, where it fits. The end faces 77 and 78 of the lens 16 are in radial planes. These surfaces are engaged by retention springs 79 and 80 which hold the lens in position axially. These springs are formed as split rings which in their free positions have outside diameters greater than that of the surface 23 of the receptacle, so that when forced into the zone of the surface 23 the circumferential surfaces of the springs frictionally grip the inside wall of the receptacle to accomplish their function of retaining the lens 16.

Extending inwardly from the end face 78 of the lens 16 is a frustoconical opening 82, which has the same taper as that of the frustoconical surface 56 at the forward end of the retaining sleeve 36. A radial surface 83 is at the inner end of the surface 82 and communicates with a blind cavity 84. The short tip 58 of the retainer sleeve 36 fits into the outer portion of the cavity 84, which is cylindrical. The inner portion of the cavity 84 is tapered and at its apical portion defines a lens surface. This is constructed in accordance with the lens disclosed in U.S. Pat. No. 4,119,362. An optical fluid 85 of predetermined index of refraction is disposed within the inner portion of the cavity 84.

The opposite end of the lens 16 is the same, including a tapered surface 87, which through a radial wall 88 connects to a blind lens cavity 89. A quantity of the optical fluid 85 is located within the cavity 89.

In mating the connector the termination assemblies 14 and 15, carrying the fibers 11 and 12, are inserted into the opposite ends of the receptacle 13 and advanced toward the lens 16. The nuts 17 and 18 are then are threaded onto the end portions 19 and 20 of the receptacle. In FIG. 4, the nut 18 is seen as started onto the end 20, but not fully advanced. In this position the forward tapered surface 56 of the retainer sleeve 36 has just reached the tapered surface 82 of the lens 16. The end of the fiber 12 is retracted within the opening 60 of the forward sleeve 36.

The inner part of the nut 18 is hollow, including an opening 92 inwardly of its end wall 38 which receives the rearward end portion 41 of the rearward sleeve 35. At the forward end of the opening 92 is a radial shoulder 93 that extends from this opening to the diameter of the threaded part of the nut. The O-ring 22 fits around the end portion 41 of the sleeve 35 adjacent the shoulder 93.

The nut then is advanced on the threaded end 20 of the receptacle to the position of FIG. 5. As this occurs, the O-ring 22 is brought into engagement with the end surface 33 of the receptacle 13 and compressed between this surface and the shoulder 93 of the nut to form a seal.

The outer end wall 38 of the nut is brought to bear against the rearward end surface 94 of the sleeve 35 as the nut advances. The end wall of the nut acts as an abutment which causes the sleeve 35 to be moved with the nut during the final increment of travel. With the sleeve 36 held against movement by the interengagement of its tapered surface 56 and the complementary lens surface 82, the spring 53 is compressed as the shoulder 48 of the sleeve 35 is advanced relative to the flange 52 of the sleeve 36. As a result, the forward sleeve 36 is biased toward the lens 16. This causes the tapered sleeve surface 56 to bear firmly against the tapered surface 82 of the lens, resulting in a centering effect between these two surfaces. The lens is relatively rigidly retained in the receptacle 13 while there is clearance around the termination assembly 15, so that latter unit makes whatever adjustment is necessary to secure accurate alignment between the sleeve 36 and the lens 16.

With the fiber 12 being gripped by the insert 40 within the rearward sleeve 35, the fiber 12 is moved axially as the rearward sleeve is advanced so that its end is pressed into the inner end portion of the cavity 84. There it is aligned with the axis of the cavity and positioned for the transmission of light through the lens between it and the other fiber 11. The excess length of the fiber 12 is accommodated in the slot 61, which forms an accumulation chamber.

The movement of the rearward sleeve 35 is terminated by the engagement of the forward face of the flange 42 of this sleeve with the shoulder 29 of the receptacle 13. These abutments provide a positive stop so that the rearward sleeve cannot move beyond a predetermined point. Therefore, the advancement of the fiber 12 and the amount of excess length to be accommodated in the accumulation chamber 61 are controlled. Also, the spring 53 is compressed a selected amount so that the tapered surface 56 of the forward sleeve 36 bears against the tapered surface 82 of the lens member 16 with a selected force.

The same thing occurs when the nut 17 is advanced on the end 19 of the receptacle. The fiber 11 is biased into the lens cavity 84 and the forward sleeve 70 is centered relative to the lens by the interengagement of its surface 71 and the tapered entrance surface 87 of the lens. At the end of the connector, the O-ring 21 becomes compressed between the nut shoulder 95 and the end surfce 30 of the receptacle 13 to form a seal. The excess length of the fiber 11 is accommodated in the slot 73. The flange 66 of the rearward sleeve 65 is brought to bear against the shoulder 28 of the receptacle to positively limit the travel of the rearward sleeve.

With the slot 73 being diametrically opposite from the slot 61, the fibers 11 and 12 are slightly inclined upwardly and downwardly, respectively, as seen in FIG. 5. This means that if there is any misalignment between the cavities 84 and 89, compensation is made to more nearly achieve precise alignment of the axes of the fibers, thereby enhancing the efficiency of light transmission.

The lens 16 and the retention springs 79 and 80 are positioned within the central portion of the receptacle 13 by means of a tool 100 in the manner shown in FIGS. 8 and 9. The tool 100 is cylindrical in shape including a short forward portion 101, an intermediate section 102, which is longer and of larger diameter than that of the section 101, and handle portion 103 of still larger diameter. The sections 101 and 102 are connected by a radial shoulder 104, while a similar shoulder 105 connects the intermediate portion 102 with the handle portion 103. An axially extending keyway 106 is formed in the handle portion 103.

Initially the lens 16, with the retention springs 79 and 80 at either end of it, is positioned within one of the outer end portions of the bore of the receptacle, such as at the right-hand end within the surface 25, as shown in FIG. 8. The free diameter of the springs 79 and 80 is less than that of the end portion of the bore 25, so that these springs are readily inserted into the receptacle. This holds true for the lens 16, as well, which is of smaller outside diameter than the diameter of the receptacle surface 25. The tool 100 is inserted into the end of the receptacle so that the forward portion 101 of the tool enters the opening defined by the outermost one of the retention springs. The diameter of the portion 101 of the tool is less than the inside diameter of the retention spring so that it can fit within the retention spring, and its length axially is less than the axial length of the spring. This means that the shoulder 104 of the tool can bear against the outer radial surface of the retention spring without contact between the end of the tool and the lens 16. The intermediate portion 102 of the tool has a diameter which is less than the diameter of the surface 25 of the receptacle, so this portion of the tool can enter the receptacle to enable the shoulder 104 to engage the retention spring 80.

Next, the tool 100 is pushed axially so that the shoulder 104 pushes axially on the outermost retention spring, which is the spring 80 as the parts are illustrated in FIGS. 8 and 9. This, in turn, pushes on the lens 16 and causes the lens 16 to push against the other retention spring 79. The tool is advanced until the shoulder 105 of the tool is brought to bear against the shoulder 29 at the inner end of the surface 27 of the receptacle 13. The handle portion 103 is of a diameter such that it can enter the opening in the receptacle defined by the surface 27 to permit the tool shoulder 105 to engage the receptacle shoulder 29 to limit the movement of the tool. The keyway 106 of the tool receives the key 32 of the receptacle so that the key does not block axial movement of the tool.

The length of the section 102 of the tool, that is, the distance between the shoulders 104 and 105, is proportioned relative to the receptacle such that when the shoulder 105 of the tool engages the shoulder 29 of the receptacle, the center of the lens 16 is positioned exactly at the center of the receptacle. In the embodiment illustrated, the distance between the shoulders 104 and 105 of the tool is equal to the distance between the receptacle's shoulder 29 and the center of the receptacle, minus the sum of the axial length of the retention spring and half the length of the lens 16. In this location the lens fits closely within the center surface 23 of the receptacle, and the retention springs 79 and 80 are compressed slightly as they enter this portion of the receptacle so that they can frictionally engage the wall of the receptacle to retain the lens. Because one of the retention springs is used to push the lens and the other retention spring into the center of the receptacle, the retention springs are caused to bear tightly against the ends of the lens, preventing any axial movement of the lens. The corners of the retention springs 79 and 80, between their circumferential surfaces and their radial end surfaces, are beveled to faciliate entry into the smaller bore portion 23 of the receptacle. The transitions between the larger outer end bores 24 and 25 of the receptacle and the central smaller diameter portion 23 also are beveled. This assures that the retention springs slide smoothly into the central portion when pushed in there by the tool 100.

After insertion of the lens, the tool 100 merely is pulled out of the receptacle, leaving the lens accurately positioned with the retention springs at either end.

The foregoing detailed description is to be clearly understood as given by way of illustration and example only, the spirit and scope of this invention being limited solely by the appended claims.

What is claimed is:

1. An optical fiber connector comprising
   a tubular receptacle having first and second opposite end portions, and a central portion intermediate said end portions,
   a lens member received in said central portion of said receptacle,
     said lens member having first and second opposite ends,
       said first and second opposite ends of said lens member including first and second lens cavities, respectively, said cavities being opposite from each other,
       said first and second ends having first and second tapered surface means, respectively,
   a friction member at either end of said lens member for retaining said lens member in said central portion of said receptacle,
   a first optical fiber termination element received in said first end portion of said receptacle,
   a second optical fiber termination element received in said second end portion of said receptacle,
     said first termination element having tapered surface means engaging said first tapered surface means of said lens member, said second termination element having tapered surface means engaging said second tapered surface means of said lens member,
   a first optical fiber carried by said first termination element,
   a second optical fiber carried by said second termination element,
     said first and second termination elements including means for gripping said first and second fibers, respectively, so that the ends of said fibers are pressed axially into said first and second lens cavities, respectively,
   a first retention means engaging said first termination element and said first end portion of said receptacle for retaining said first termination element in said receptacle,
   a second retention means engaging said second termination element and said second end portion of said receptacle for retaining said second termination element in said receptacle,
     said first and second termination elements being entirely received within said tubular receptacle and said first and second retention means,
   a first seal within said first retention means, said first seal engaging said first retention member, said first end portion of said receptacle and said first termination element for preventing entry of foreign matter into said first end portion of said receptacle,
   and a second seal within said second retention means, said second seal engaging said second retention member, said second end portion of said receptacle and said second termination element for precluding entry of foreign matter into said second end portion of said receptacle.

2. A device as recited in claim 1 in which each of said friction members is a spring.

3. A device as recited in claim 2 in which each of said springs is a split ring having a free outside diameter greater than the inside diameter of said central portion of said receptacle.

4. A device as recited in claim 2 in which the inside diameter of said end portions of said receptacle is greater than said inside diameter of said central portion of said receptacle, and is greater than said free outside diameters of said springs and the outside diameter of said lens member, whereby said springs and said lens member are freely insertable into said end portions of said receptable.

5. An optical fiber connector comprising
   a tubular receptacle having first and second opposite end portions, an end surface at each of said opposite end portions, and a central portion intermediate said end portions,
   a lens member received in said central portion of said receptacle,
     said lens member having first and second opposite ends,
       said first and second opposite ends of said lens member including first and second lens cavities, respectively, said cavities being opposite from each other,
       said first and second ends having first and second tapered surface means, respectively,
   means for retaining said lens member in said central portion of said receptacle,
   a first optical fiber termination element received in said first end portion of said receptacle, said first optical fiber termination element including
     a first forward member,
     a first rearward member having an abutment and a cylindrical surface rearwardly of said abutment thereof,
     and a first resilient means biasing said first forward member forwardly toward said lens member relative to said first rearward member,
       said first forward member having a tapered surface means engaging said first tapered surface means of said lens member,
   a second optical fiber termination element received in said second end portion of said receptacle, said second optical fiber termination element including
     a second forward member,
     a second rearward member having an abutment and
     a cylindrical surface rearwardly of said abutment thereof,
     and a second resilient means biasing said second forward member forwardly toward said lens member relative to said second rearward member,
       said second forward member having a tapered surface means engaging said second tapered surface means of said lens member,
   a first optical fiber carried by said first termination element,
   a second optical fiber carried by said second termination element,
     said first and second rearward members including means for gripping said first and second fibers respectively, so that the ends of said fibers are pressed axially into said first and second lens cavities, respectively,
     said receptacle having abutments engaged by said abutments of said first and second rearward members for axially positioning said first and second rearward members relative to said lens member, a first nut engaging said first termination element and said first end portion of said receptacle for retaining said first termination element in said receptacle, said first end portion of said receptacle being externally threaded and meshed with said first nut, a second nut engaging said second termination element and said second end portion of said receptacle for retaining said second termination element in said receptacle, said second end portion of said receptacle being externally threaded and meshed with said second nut, said first and second termination elements being entirely received within said tubular receptacle and said first and second nuts, a first seal within said first nut, said first seal engaging said first nut, said first end portion of said receptacle and said first termination element for preventing entry of foreign matter into said first end portion of said receptacle, and a second seal within said second nut, said second seal engaging said second nut, said second end portion of said receptacle and said second termination element for precluding entry of foreign matter into said second end portion of said receptacle, each of said retention nuts including a generally radial surface, said first and second seals being annular members, said first seal circumscribing said cylindrical surface of said first rearward member and being interposed between said generally radial surface of said first nut and said end surface of said first end portion of said tubular receptacle, said second seal circumscribing said cylindrical surface of said second rearward member and being interposed between said generally radial surface of said second nut and said end surface of said second end portion of said tubular receptacle.

6. An optical fiber connector comprising a tubular receptacle having first and second opposite end portions, and a central portion intermediate said ends, a lens member received in said central portion of said receptacle, said lens member having first and second opposite ends, said first and second opposite ends of said lens member including first and second lens cavities, respectively, said cavities being opposite from each other, means for retaining said lens member in said central portion of said receptacle, said retaining means including a member engaging and being frictionally held axially of said tubular receptacle adjacent each of said opposite ends of said lens member, a first optical fiber termination element received in said first end portion of said receptacle, a second optical fiber termination element received in said second end portion of said receptacle, a first optical fiber carried by said first termination element, a second optical fiber carried by said second termination element, said first and second termination elements including means for gripping said first and second fibers, respectively, so that the ends of said fibers are pressed axially into said first and second lens cavities, respectively, a first retention means engaging said first termination element and said first end portion of said receptacle for retaining said first termination element in said receptacle, and second retention means engaging said second termination element and said second end portion of said receptacle for retaining said second termination element in said receptacle, said first and second termination elements being entirely received within said tubular receptacle and said first and second retention means.

7. A device as recited in claim 6 in which said first and second retention means are first and second nuts, respectively, having threaded portions and hollow portions inwardly of said threaded portions receiving the ends of said first and second termination elements, respectively, said first and second end portions of said tubular receptacle being externally threaded and engaged by said threaded portions of said nuts.

8. A device as recited in claim 7 in which each of said first and second nuts includes a shoulder between said threaded portion and said hollow portion thereof, and including a first annular seal member circumscribing and engaging said first termination element and compressed between said shoulder of said first nut and a surface of said first end portion of said receptacle, and a second annular seal member circumscribing and engaging said second termination element and compressed between said shoulder of said second nut and a surface of said second end portion of said receptacle.

9. A device as recited in claim 6 in which said means for gripping said first and second fibers includes a first resilient member received in the end portion of said first termination element remote from said lens member, said first resilient member having an opening receiving said first optical fiber, said first termination element being crimped inwardly so as to compress said first resilient member and cause said first resilient member to frictionally grip said first optical fiber at said opening in said first resilient member, and a second resilient member received in the end portion of said second termination member remote from said lens member, said second resilient member having an opening receiving said second optical fiber, said second termination element being crimped inwardly so as to compress said second resilient member and cause said second resilient member to frictionally grip said second optical fiber at said opening in said second resilient member.

10. The method of interconnecting optical fibers comprising the steps of providing a tubular receptacle, providing a lens of transparent material of predetermined index of refraction with tapered cavities at the opposite ends thereof, introducing into said cavities a quantity of optical material, providing a duality of friction members, each of which is receivable in said tubular receptacle for frictionally engaging the central portion of the inner wall thereof, positioning one of said friction members within said tubular receptacle at one end portion thereof, positioning said lens in said one end portion of said tubular receptacle with one end of said lens adjacent said one friction member, positioning the other of said friction members in said one end portion of said tubular receptacle adjacent the opposite end of said lens, then pushing on said other friction member to advance the same and cause said other friction member to push said lens to a predetermined location within said tubular receptacle, with said one friction member engaging said one end of said lens and said other friction member engaging said opposite end of said lens, and then positioning an optical fiber in each of said cavities for transmitting light therebetween through said lens.

11. The method as recited in claim 10 in which said friction members are made as split rings having a free diameter greater than that of said central portion of said inner wall.

12. The method of claim 11 in which said free diameters of said split rings are made less than the diameter of said inner wall of said tubular receptacle at said one end portion thereof, whereby said friction members are freely insertable into said one end portion of said receptacle.

13. The method as recited in claim 10 in which for so pushing on said other friction member a tool is provided having an elongated portion having a first abutment, and a second abutment spaced a predetermined distance from said first abutment, said tubular receptacle is provided with an abutment, and said tool is pushed into said tubular receptacle with said first abutment of said tool engaging said other friction member until said second abutment of said tool engages said abutment of said tubular receptacle, and including the step of subsequently removing said tool from said tubular receptacle.

14. The method as recited in claim 13 in which said tool is provided with a relatively short portion of relatively small diameter projecting beyond said first abutment, and in which said relatively short portion of relatively small diameter is inserted into said other friction member when said tool so pushes on said other friction member.

* * * * *